United States Patent Office 3,579,614
Patented May 18, 1971

3,579,614
2-CYANOVINYL PHOSPHATES AND PHOSPHOROTHIOATES
Bernard Miller, Plainsboro, and Howard Margulies, Princeton Junction, N.J., assignors to American Cyanamid Company, Stamford, Conn.
No Drawing. Filed Aug. 8, 1967, Ser. No. 659,014
Int. Cl. C07f 9/08; A01n 9/36
U.S. Cl. 260—940
9 Claims

ABSTRACT OF THE DISCLOSURE

The present invention relates to novel 2-cyanovinyl phosphates and phosphorothioates and their isomers, a method for their preparation and the use of said compounds for control of pests which damage or destroy agronomic crops and/or spread infection or disease to man, animal and bird populations.

---

The present invention relates to novel cyanovinyl phosphates and phosphorothioates and more particularly to novel 2-cyanovinyl phosphates and phosphorothioates. The invention further relates to a method for their preparation and to processes of using said compounds for control of pests which damage or destroy agronomic crops and/or spread infection or disease to man, animal and bird population.

According to the present invention novel compounds are provided having the general formula:

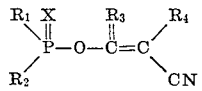

wherein $R_1$ and $R_2$ are members each selected from the group consisting of lower alkyl $C_1$–$C_4$, lower alkoxy $C_1$–$C_4$, aryl, alkaryl and aralkyl, mono- and dialkylamino; $R_3$ is lower alkyl; $R_4$ is hydrogen or lower alkyl and X is sulfur or oxygen, and include the cis and trans isomers and mixtures of isomers thereof.

For purposes of clarity the cis and trans isomeric forms of 2-cyanovinyl esters described above are

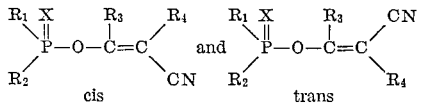

where the values for $R_1$, $R_2$, $R_3$, $R_4$ and X are as set forth above.

In the present description, reference to the single general formula set forth above is intended to include either or both isomeric forms unless the cis or trans form is specified.

The compounds of the invention may be prepared by phosphorylating an α-cyanoketone, generally in the presence of a strong base. Graphically the reaction may be shown as follows:

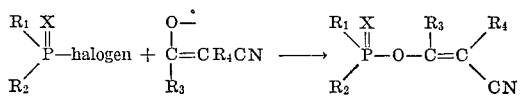

wherein the $R_1$, $R_2$, $R_3$, $R_4$ and X groups are as described above.

In carrying out the process, a cyanoketone such as cyanoacetone, 2-cyano-3-pentanone, 2-cyano-3-hexanone, 3-cyano-2-pentanone, 3-cyano-4-hexanone or the like, is dissolved or dispersed in a solvent or diluent such as water, dimethylsulfoxide, acetone, methylisobutylketone, a lower alcohol such as t-butyl alcohol, isopropanol or butanol or the like; containing a strong base such as sodium or potassium t-butoxide, sodium or potassium hydroxide or sodium or potassium carbonate. The solution or mixture is then treated with a phosphorylating agent such as O,O-diisopropyl phosphorochloridothioate, O-ethyl ethylphosphonochloridate, o-ethyl o-phenyl phosphorochloridothioate, O,O-dimethyl phosphorochloridothioate, O,O-diphenyl phosphorochloridothioate or O-ethyl benzylphosphonochloridate. The latter reaction may be conducted over a wide range of temperatures as for example, between about 0 and 100° C., but preferably between about 25 and 70° C. and with agitation of the reaction mixture. The thus formed product may be separated from the reaction mixture by treatment of the mixture with a solvent such as toluene or methylene chloride, followed by washing with water and drying. Drying may be accomplished by any convenient means as by evaporation under vacuum.

The novel esters of this invention are useful for controlling a wide variety of pests including insects, arachnids and nematodes. They may be applied to the foliage of plants as dusts or liquid sprays to protect them from insects which feed thereon; they may also be incorporated in or applied to the soil in order to protect germinating and growing plants from soil-borne pests which attack the root systems and stems of said plants; or they may be applied to the breeding sites of pests to control both the larval and adult stages of breeding pest populations. In the latter situations the compounds may be applied in conventional formulations such as dusts, dust concentrates, granular materials, wettable powders, emulsifiable concentrates and the like. They may be employed as an emulsion in water or other non-solvents to which suitable surfactants, wetting agents or emulsifying agents have been added. They may be applied on solid carriers, such as talcs and clays, as for example kaolin clay or fuller's earth, or on such carriers as chalk, wood flour, silica, charcoal, activated carbon or other inert powders. As a wettable powder, the compound of this invention may be applied to easily wettable carrier materials, such as attaclay, with or without the aid of surfactants, or on less readily wettable carriers in combination with suitable surfactants.

Advantageously, the compounds of the invention may also be applied by the most modern techniques of low volume or ultra-low volume application wherein the compound is applied essentially as a technical material or in combination with a minor amount of solvent such as the slow evaporating, high aromatic solvents such as Panasol AN-5, Socal 44-L or Esso HAN (all commercially available). With some of the novel compounds of this invention, toxicants such as malathion or dimethoate may be used as the solvent or diluent carrier for ultra-low volume application.

In order that the present invention may be more fully understood, the following examples are given primarily by way of illustration. No specific details or enumerations contained therein should be construed as limitations on the present invention, except insofar as they appear in the appended claims. All parts and percentages are by weight unless otherwise specifically designated.

EXAMPLE 1

Preparation of O,O-diethyl-O-2-cyano-1-methylvinyl phosphorothioate

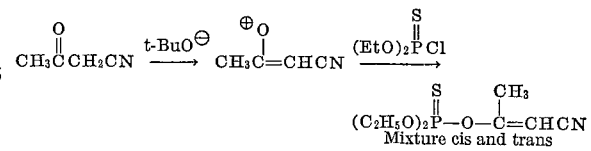

Cyanoacetone (20.0 g.) was added drop by drop to a stirred solution of potassium t-butoxide (27.0 g.) in 500 ml. of t-butyl alcohol. O,O-diethyl phosphorochloridothioate (45.4 g.) was then added, and the mixture heated to reflux for 1.5 hours. It was then cooled and methylene chloride added. The mixture was washed several times with water, dried over magnesium sulfate, and the solvent evaporated to give 43 g. of dark oil. Nuclear Magnetic Resonance (NMR) analysis suggested this was about 85% pure, with O,O-diethyl phosphorochloridothioate the principal impurity. Chromatography on magnesium silicate gave 31.0 g. of a mixture of the cis and trans isomers of the above compound. The mixture was submitted for pesticidal evaluation. The purest sample had a refractive index $n_D^{25}$ 1.4806.

The isomers were separated chromatographically and submitted individually for pesticidal evaluation.

*Analysis.*—Calcd. for $C_8H_{14}PHSO_3$ (percent): C, 40.8; H, 6.00; N, 5.95; S, 13.62; P, 13.17. Found (percent): C, 40.76; H, 6.13; N, 5.76; S, 13.97; P, 13.09.

EXAMPLE 2

Preparation of diethyl O-2-cyano-1-methylvinyl phosphate

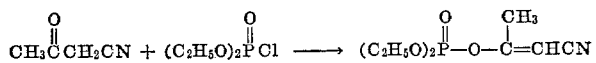

Following the procedure essentially as set forth in Example 1, 15 grams of cyanoacetone was slowly added to a stirred solution of 20.3 grams of potassium t-butoxide in 500 ml. of t-butyl alcohol. 31.1 grams of diethyl phosphoryl chloride was added to the mixture and the mixture stirred at room temperature for 1½ hours. Methylene chloride was then added, the mixture was washed with water, dried over magnesium sulfate and the solvent evaporated to give 35 grams of a dark oil. NMR indicated the product to be 95% pure, having as a refractive index $n_D^{25}$ 1.4440.

*Analysis.*—Calcd. for $C_8H_{14}PNO_4$ (percent): C, 43.8; H, 6.44; N, 6.40; P, 14.12. Found (percent): C, 43.66; H, 6.41; N, 6.41; P, 14.16.

EXAMPLE 3

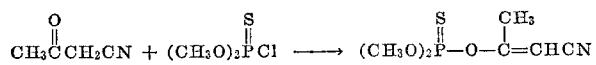

5 grams of cyanoacetone was dissolved in t-butyl alcohol containing 6.8 grams of potassium t-butoxide. This solution was phosphorylated by adding 9.7 grams of O,O-dimethyl phosphorochloridothioate to the solution and heating the resulting mixture to 60° C. for 1 hour. After cooling, methylene chloride was added with stirring to the mixture. This was then washed with water, dried over magnesium sulfate and 6.6 grams of a dark oil recovered. After washing with hexane the oil was chromatographed on a column of magnesium silicilate. The refractive index of the product was $n_D^{25}$ 1.4897.

*Analysis.*—Calcd. for $C_6H_{10}PNSO_3$ (percent): C, 34.8; H, 4.87; N, 6.76; S, 15.47; P, 14.95. Found (percent): C, 35.60; H, 5.18; N, 6.75; S, 15.40; P, 14.93.

EXAMPLE 4

Preparation of O-ethyl O-2-cyano-1-methylvinyl ethylphosphonate

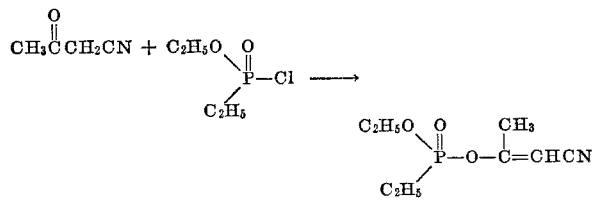

Following procedure substantially as described in Example 2, 6.0 grams of cyanoacetone was dissolved in t-butyl alcohol containing 8.2 grams of potassium-t-butoxide. 11.3 grams of O-ethyl ethylphosphonochloridate was slowly added to this solution and the mixture stirred for 15 minutes at room temperature. Using the recovery procedure of Example 2, 10.9 grams of a dark oil was obtained having a refractive index $n_D^{25}$ 1.4588.

*Analysis.*—Calcd. for $C_8H_{14}PNO_3$ (percent): C, 47.3; H, 6.95; N, 6.90; P, 15.25. Found (percent): C, 47.57; H, 7.11; N, 7.03; P, 15.22.

EXAMPLE 5

Preparation of O,O-diisopropyl O-2-cyano-1-methylvinyl phosphorothioate

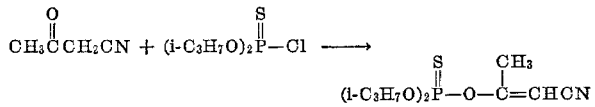

Following the procedure of Example 1, 5.6 grams of cyanoacetone was dissolved in t-butyl alcohol containing 7.6 grams of potassium t-butoxide and phosphorylated by addition of 14.6 grams of O,O-diisopropyl phosphorochloridothioate. The mixture was refluxed for ½ hour, cooled, and extracted with methylene chloride. The organic layer was washed with water and dried. 11.0 grams of a dark yellow oil was obtained, $n_D^{25}$ 1.4710.

*Analysis.*—Calcd. for $C_{10}H_{18}PNSO_3$ (percent): C, 45.7; H, 6.90; N, 5.33; S, 12.18; P, 11.77. Found (percent): C, 46.00; H, 7.13; N, 5.09; S, 12.10; P, 11.54.

EXAMPLE 6

Preparation of O,O-diethyl O-2-cyano-2-methyl-1-ethylvinyl phosphorothioate

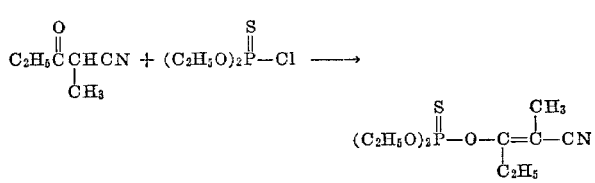

The above named compound was prepared by substantially the same procedure described in Example 1. In the process, 2.1 grams of 2-cyano-3-pentanone was dissolved in t-butyl alcohol containing 2.12 grams of potassium-t-butoxide. 3.56 grams of O,O-diethyl phosphorochloridothioate was then slowly added to the solution and the thus prepared mixture refluxed for one hour. The mixture was then extracted with methylene chloride, and the organic layer washed with water and dried. 3.0 grams of yellow oil was recovered. This oil had a refractive index $n_D^{25}$ 1.4761 and analyzed as follows:

*Analysis.*—Calcd. for $C_{10}H_{18}PNSO_3$ (percent): C, 45.70; H, 6.90; N, 5.33; S, 12.18; P, 11.77. Found (percent): C, 45.80; H, 6.90; N, 5.32; S, 12.06; P, 11.63.

EXAMPLE 7

Preparation of O,O-dipropyl O-2-cyano-1-methylvinyl phosphorothioate

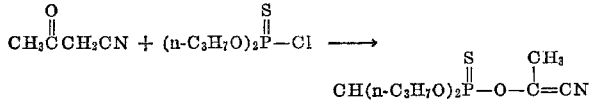

3.0 grams of cyanoacetone was dissolved in t-butyl alcohol containing 4.05 grams of potassium t-butoxide. 7.85 grams of di-n-propyl phosphoryl chloride was added to the solution over an extended period of time and the mixture heated for two hours at 65° C. After extraction with methylene chloride, water washing, and drying, 7.0 grams of product was obtained having a refractive index $n_D^{25}$ 1.4766 and the following analysis:

*Analysis.*—Calcd. for $C_{10}H_{15}PNSO_3$ (percent): C. 45.7; H, 6.90; N, 5.33; S, 12.18; P, 11.77. Found (percent): C, 45.64; H, 6.70; N, 5.15; S, 12.08; P, 11.12.

EXAMPLE 8

The insecticidal activity of the compounds of the invention is demonstrated in the following tests in which *Aphis* fabae, Prodenia eridania, Tribolium confusum, Oncopeltus fasciatus, Blattella germanica, Musca domestica, Diabrotica undecimpunctata howardi and Anopheneles quadrimaculatus are employed as test insect species. The procedures employed for evaluating candidate compounds against these insects are provided below and the results obtained with graded levels of toxicant are given in Table I.

Insecticide evaluation procedures

Bean aphid—*Aphis fabae* Scopoli.—Compounds are tested as 0.1%, 0.01% and 0.001% solutions or suspensions in 65% acetone–35% water. Two-inch fiber pots, each contining a nasturtium plant about two inches high and infested with about 150 aphids two days earlier, are placed on a turntable and sprayed with test solution so as to give complete coverage of the aphids and the plants. The sprayed plants are laid on their sides on white enamel trays which have had the edges coated with oil as a barrier. Mortality estimates are made after holding for two days at 70° F., and 50% r.h.

Southern army worm—*Prodenia eridania* (Cramer).— 0.1% and 0.01% solutions, prepared as above, are used for this test. Sieva lima bean primary leaves are dipped for three seconds in the test solution and set in a hood to dry. When dry, each leaf is placed in a 4-inch Petri dish which has a moist filter paper in the bottom along with ten third-instar armyworm larvae about ⅜″ long. The dishes are covered and held at 80° F., and 60% r.h. After 2 days, mortality counts and estimates of the amount of feeding are made and recorded.

Confused flour beetle—*Tribolium confusum* Jacquelin du Val.—Compounds are formulated as 1% dusts on talc. 125 mg. of this 1% dust is then blown into the top of a dust settling tower. The dust is allowed to settle on four-inch petri dishes for two minutes, giving a deposit of approximately 87 mg./sq. foot of the 1% dust. The dishes are removed and 25 adult confused flour beetles are added immediately. The dishes are held for three days at 80° F. an 60% r.h., following which mortality counts are made and recorded.

Large milkweed bug—*Oncopeltus fasciatus* (Dallas).— The 1% dusts described above are used in this test. 25 mg. of the 1% dust is sprinkled evenly over the glass bottom of a seven-inch diameter cage, giving a deposit of approximately 94 mg./sq. ft. of the 1% dust. Water is supplied in a two-ounce bottle with a cotton wick, twenty adult bugs are added and a screen cover placed on the top. Mortality counts are made after holding for three days at 80° F. and 60% r.h.

TABLE I.—DATA GIVEN AS PERCENT KILL

| Compounds [1] | A' worms [2] | | Aphids | | | TC [3] 1% | MB [4] 1% | GC [5] 1% | Mosquito | | | Fly | |
| --- | --- | --- | --- | --- | --- | --- | --- | --- | --- | --- | --- | --- | --- |
| | | | | | | | | | Larvae | | Adults | | |
| | .1% | .01% | .1% | .01% | .001% | | | | .4 p.p.m. | .1 p.p.m. | 10 p.p.m. | 50 p.p.m. | 5 p.p.m. |
| $(C_2H_5O)_2\overset{S}{\overset{\|}{P}}-O-\overset{CH_3}{\underset{\|}{C}}=CH-C\equiv N$ | 100 | 100 | 100 | 100 | 98 | 54 | 15 | 100 | 100 | 100 | 100 | 100 | 100 |
| $(C_2H_5O)_2\overset{O}{\overset{\|}{P}}-O-\overset{CH_3}{\underset{\|}{C}}=CH-C\equiv N$ | 100 | 100 | 100 | 100 | 100 | 100 | 100 | 100 | 100 | 16 | 100 | 100 | 100 |
| $(CH_3O)_2\overset{S}{\overset{\|}{P}}-O-\overset{CH_3}{\underset{\|}{C}}=CH-C\equiv N$ | 100 | 100 | 100 | 100 | 190 | 92 | 0 | 60 | 100 | 96 | 0 | 100 | 100 |
| $\underset{C_2H_5}{\overset{C_2H_5O}{\diagdown}}\overset{O}{\overset{\|}{P}}-O-\overset{CH_3}{\underset{\|}{C}}=CH-C\equiv N$ | 100 | 100 | 100 | 100 | 100 | 100 | 100 | 100 | 100 | 24 | 20 | 100 | 100 |
| $(l\text{-}C_3H_7O)_2\overset{O}{\overset{\|}{P}}-O-\overset{CH_3}{\underset{\|}{C}}-CH-C\equiv N$ | 100 | 0 | 100 | 98 | 0 | 0 | 0 | 10 | 100 | 88 | 0 | 100 | 100 |
| $(C_2H_5O)_2\overset{S}{\overset{\|}{P}}-O-\overset{C_2H_5}{\underset{\underset{CH_3}{\|}}{C}}=C-C\equiv N$ | 100 | 0 | 100 | 25 | 0 | 20 | 0 | 0 | --- | --- | --- | --- | --- |
| $(n\text{-}C_3H_7O)_2\overset{S}{\overset{\|}{P}}-O-\overset{CH_3}{\underset{\|}{C}}=CH-C\equiv N$ | 100 | 60 | 100 | 100 | 0 | 0 | 0 | 0 | 100 | 100 | 100 | 100 | 36 |

[1] Mixtures of cis- and trans-isomers.  [2] A' worms—Southern armyworms.  [3] TC—*Tribolium confusium*.  [4] MB—Large milkweed bug.  GC—German cockroach.

German cockroach—*Blattella germanica* (Linnaeus).— The procedure employed is the same as for the Large Milkweed bug test.

Common malaria mosquito—*Anopheles quadrimaculatus* Say.—Test compounds are prepared as 10 p.p.m. solutions in acetone. The solutions are applied to a hard surface where the mosquitoes may contact the same and a sugar solution is provided as food. Mortality counts are made after 24 hours of continuous exposure to the treated surface.

Housefly—*Musca domestica* Linnaeus.—25 female houseflies are placed in a cage and permitted to feed on a 10% sugar solution containing 5 or 50 p.p.m. of candidate compound. After 2 days mortality counts are made and recorded.

EXAMPLE 9

The miticidal activity of the compounds of the invention is shown by the following tests, designed to evaluate both the contact and systemic activities of test compounds. The results are set forth in Table II.

Two-spotted spider mite—*Tetranychus urticae* Koch.— Sieva lima bean plants with primary leaves three to four inches long are infested with about 100 adult mites per leaf four hours before use in this test. The mite and egg infested plants are dipped for three seconds in an aqueous acetone solution containing .01% toxicant, and the plants set in the hood to dry. They are held for two days at 80° F., 60% r.h., and the adult mite mortality estimated on one leaf under a stereoscopic microscope. The other leaf is left on the plant an additional five days and then examined to estimate the kill of eggs and of newly-hatched nymphs, giving a measure of ovicidal and residual action, respectively.

TABLE II.—DATA GIVEN AS PERCENT KILL

| Compounds [1] | Contact—mites Rate, 0.01% | Systemics—mites | |
|---|---|---|---|
| | | 100 p.p.m. | 10 p.p.m. |
| $(C_2H_5O)_2\overset{S}{\overset{\|}{P}}-O-\overset{CH_3}{\overset{\|}{C}}=CH-C\equiv N$ | 100 | 100 | 92 |
| $(C_2H_5O)_2\overset{O}{\overset{\|}{P}}-O-\overset{CH_3}{\overset{\|}{C}}=CH-C\equiv N$ | 100 | 100 | 100 |
| $(CH_3O)_2\overset{S}{\overset{\|}{P}}-O-\overset{CH_3}{\overset{\|}{C}}=CH-C\equiv N$ | 73 | 100 | 78 |
| $\begin{array}{c}C_2H_5O\\ \diagdown\\ C_2H_5\end{array}\overset{O}{\overset{\|}{P}}-O-\overset{CH_3}{\overset{\|}{C}}=CH-C\equiv N$ | 100 | 100 | 97 |
| $(i\text{-}C_3H_7O)_2\overset{O}{\overset{\|}{P}}-O-\overset{CH_3}{\overset{\|}{C}}=CH-C\equiv N$ | 0 | 100 | 38 |
| $(n\text{-}C_3H_7O)_2\overset{S}{\overset{\|}{P}}-O-\overset{CH_3}{\overset{\|}{C}}=CH-C\equiv N$ | 100 | 0 | 0 |

[1] Mixtures of cis- and trans-isomers.

Systemic test

The compound to be tested is formulated as an emulsion containing 10 or 100 p.p.m. of test compound, emulsifier, acetone and water. A Sieva lima bean plant with only the primary leaves unfolded is cut off just above soil level and inserted into a bottle of 10 or 100 p.p.m. emulsion and held in place by a bit of cotton wrapped around the stem. The bottle is then placed in a ventilated box with the leaves extending outside the box, such that any possible fumes from the compound will be drawn out the end of the box rather than rising to affect the test leaves. About 50 adult two-spotted spider mites are placed on each leaf. After holding three days at 80° F. and 60% r.h., mortality estimates are made and the results recorded.

EXAMPLE 10

The soil insecticidal activity of the compounds of the invention is demonstrated by the following tests against Southern corn rootworm, false wireworm and black cutworms.

The results are set forth in Table III.

Southern corn rootworm—*Diabrotica undecimpunctata howardi*.—Barber Test compounds are formulated as a dust and incorporated into the soil at the equivalent of 50 or 10 pounds per 6-inch acre. The soil is sub-sampled into widemouth bottles and ten 6- to 8-day old rootworm larvae added to each bottle which is then capped. Mortality counts are made after six days at 80° F., 60% r.h.

False wireworm—*Eleodes suturalis* (Say).—The test is the same as with the rootworms except that 10-day old wireworm larvae are used.

Black cutworm—*Agrotis ipsilon* (Hufnagel).—10% granular formulations of trans-O,O-diethyl O-2-cyano-1-methylvinyl phosphorothioate and cis O,O-diethyl O-2-cyano-1-methylvinyl phosphorothioate on attaclay were applied at the rate of 1 pound per acre in seven inch bands over planted corn seed. The treated rows were then infested with cutworm larvae and three days thereafter examined for mortality. 62% mortality was recorded for the trans-isomer while only about 30% was observed for the cis-isomer. Five days after treatment 100% control was achieved with the trans-isomer while only about 50% control was obtained with the cis-isomer. The treated areas were then reinfested and the plants watered. Two days thereafter 100% kill was observed for the trans-isomer. Untreated control showed no kill and the cis-isomer was again noted to be about one-half as active as the trans-isomer at the level of toxicant tested. At higher levels substantially complete control of black cutworms can also be achieved with cis-O,O-diethyl-O-2-cyano-1-methylvinyl phosphorothioate.

TABLE III.—DATA GIVEN IN PERCENT KILL

| Compounds [1] | Rootworms | | | Wireworms | |
|---|---|---|---|---|---|
| | 10 Lb./acre | 1 Lb./acre | 0.1 Lb./acre | 10 Lg./acre | 1 Lb./acre |
| $(C_2H_5O)_2\overset{S}{\overset{\|}{P}}-O-\overset{CH_3}{\overset{\|}{C}}=CH-C\equiv N$ | 100 | 100 | 100 | 100 | 100 |
| $(C_2H_5O)_2\overset{O}{\overset{\|}{P}}-O-\overset{CH_3}{\overset{\|}{C}}=CH-C\equiv N$ | 100 | 0 | | | |
| $(CH_3O)_2\overset{S}{\overset{\|}{P}}-O-\overset{CN_3}{\overset{\|}{C}}=CH-C\equiv N$ | 100 | 100 | 0 | | |
| $\begin{array}{c}C_2H_5O\\ \diagdown\\ C_2H_5\end{array}\overset{O}{\overset{\|}{P}}-O-\overset{CH_3}{\overset{\|}{C}}=CH-C\equiv N$ | 100 | 0 | | | |
| $(i\text{-}C_3H_7O)_2\overset{O}{\overset{\|}{P}}-O-\overset{CH_3}{\overset{\|}{C}}=CH-C\equiv N$ | 100 | 90 | 0 | | |
| $(C_2H_5O)_2\overset{S}{\overset{\|}{P}}-O-\overset{C_2H_5}{\overset{\|}{C}}=\overset{}{\underset{CH_3}{C}}-C\equiv N$ | 100 | 0 | | | |
| $n\text{-}C_3H_7O)_2\overset{S}{\overset{\|}{P}}-O-\overset{CH_3}{\overset{\|}{C}}=CH-C\equiv N$ | 100 | 100 | 0 | | |

[1] Mixtures of cis and trans-isomers.

EXAMPLE 11

The fumigant activity of the compounds of the invention is demonstrated by the following tests wherein slightly moist potting soil is placed in a container with 10 larvae each of Southern corn rootworm and false wireworm.

A filler paper is then treated with an acetone solution containing sufficient compound to provide 0.5 or 1.0 mg. of compound per liter of air in the container containing the insect infested soil. The filter paper is suspended in the container and the container capped. The contents of the container were examined 24 and 48 hours after capping and insect mortality determined. The results are provided in table form below:

TABLE IV

| Compound | Rate, mg./l. | Percent kill of insects | | | |
|---|---|---|---|---|---|
| | | 24 hours | | 48 hours | |
| | | Root-worms | Wire-worms | Root-worms | Wire-worms |
| Trans O-2-cyano-1-methylvinyl O,O-diethyl phosphorothio-ate | 1.0 | 100 | 95 | 100 | 100 |
| | 0.5 | 100 | 100 | 100 | 100 |
| Cis O-2-cyano-1-methylvinyl O,O-diethyl phosphorothio-ate | 1.0 | 100 | 70 | 100 | 100 |
| | 0.5 | 89 | 60 | 100 | 100 |

EXAMPLE 12

Adult house fly (*Musca domestica*, L.) knockdown

Test materials were formulated as 25% emulsifiable concentrates, containing 25% by weight of toxicant, 10% by weight of a non-ionic-anionic emulsifier and 65% by weight of xylene, and diluted to 1.0% and 0.25% with water for spraying on plywood and glass panels, 5½" x 7½". After the panels were sprayed and air-dried, they were placed in one gallon battery jars. One hundred adult female house flies were placed into the jar, which was then covered with a screen top. Thereafter knockdown counts were made at frequent intervals. The results are shown in Table V.

TABLE V

| Compound | Type of surface | Concentration of spray solution, percent | Knockdown time, 90% knockdown, minutes |
|---|---|---|---|
| Trans O-2-cyano-1-methyl, O-diethyl phosphorothioate. | Glass | 0.25 | 17 |
| Cis O-2 cyano-1-methyl, O-diethyl phosphorothioate. | do | 0.25 | 28 |
| 1,2-dibromo-2,2-dichloroethyl dimethyl phosphate. | do | 0.25 | 9 |
| Trans O-2-cyano-1-methyl, O-diethyl phosphorothioate. | Plywood | 0.25 | 35 |
| Cis O-2-cyano-1-methyl, O-diethyl phosphorothioate. | do | 0.25 | 75 |
| 1,2-dibromo-2,2-dichloroethyl dimethyl phosphate. | do | 0.25 | 130 |
| Trans O-2-cyano-1 methyl, O-diethyl phosphorothioate. | do | 1.0 | 20 |
| Cis O-2 cyano-1-methyl, O-diethyl phosphorothioate. | do | 1.0 | 24 |
| 1,2-dibromo-2,2 dichloroethyl dimethyl phosphate. | do | 1.0 | 36 |

EXAMPLE 13

The nematocidal activity of the compounds of the instant invention is demonstrated by the following test in which a mixture of cis- and trans-isomers of O-2-cyano-1-methylvinyl O,O-diethyl phosphorothioate was admixed with soil in sufficient amounts to provide the equivalents of 10 and 50 pounds per acre of active ingredient. The treated soil was placed in one pint cups and inoculated with eggs and larvae of the root knot nematode (Meloidogyne sp.). Following inoculation the cups were placed in a controlled temperature and humidity cabinet maintained at 75° F. for one week. After incubation the cups were removed to the greenhouse and tomato seedlings planted in the cups. Four weeks after planting all plants were removed and examined for root galling. 100% control of root knot nematodes was obtained at both the 10 and 50 pound rates employed. As demonstrated no root galling was noted. Untreated controls showed heavy galling of the tomato root systems.

We claim:
1. A member selected from the group consisting of:

(a) cis-2-cyanovinyl phosphates and phosphorothioates of the formula:

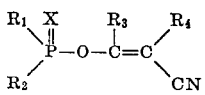

(b) trans-2-cyanovinyl phosphates and phosphorothioates of the formula:

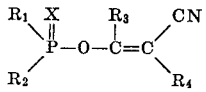

(c) and cis-trans mixtures of the above wherein $R_1$ and $R_2$ are members selected from the group consisting of lower alkoxy ($C_1$–$C_4$); $R_3$ is lower alkyl; $R_4$ is hydrogen or lower alkyl and X is sulfur or oxygen.

2. As a compound according to claim 1, cis-O-2-cyano-1-methylvinyl O,O-diethyl phosphorothioate.

3. As a compound according to claim 1, trans-O-2-cyano-1-methylvinyl O,O-diethyl phosphorothioate.

4. A composition according to claim 1: a mixture of cis and trans-O-2-cyano-1-methylvinyl O,O-diethyl phosphate.

5. A composition according to claim 1: a mixture of cis and trans-O-2-cyano-1-methylvinyl O,O-diethyl phosphorothioate.

6. A composition according to claim 1: a mixture of cis and trans-O-2-cyano-1-methylvinyl O,O-diisopropyl phosphorothioate.

7. A composition according to claim 1: a mixture of cis and trans-O-2-cyano-2-methyl-1-ethylvinyl O,O-diethyl phosphorothioate.

8. A composition according to claim 1: a mixture of cis and trans-O-2-cyano-1-methylvinyl O,O-dipropyl phosphorothioate.

9. A composition according to claim 1: a mixture of cis and trans-O-2-cyano-1-methylvinyl O,O-dimethyl phosphorothioate.

References Cited

UNITED STATES PATENTS

| 2,550,651 | 4/1951 | Dickey et al. | 260—940X |
| 3,216,894 | 11/1965 | Lorenz et al. | 260—940X |

CHARLES B. PARKER, Primary Examiner

A. H. SUTTO, Assistant Examiner

U.S. Cl. X.R.
260—971; 424—210